United States Patent [19] [11] 3,732,361
Makara [45] May 8, 1973

[54] COLOR VIDEO SIGNAL MAGNETIC RECORDING-REPRODUCING SYSTEM HAVING A FUNCTION OF OPTIMUM RECORDING CURRENT LEVEL SETTING

[75] Inventor: Satoshi Makara, Tokyo, Japan

[73] Assignee: Nippon Electric Company Limited, Tokyo, Japan

[22] Filed: Mar. 22, 1971

[21] Appl. No.: 126,862

[30] Foreign Application Priority Data

Mar. 25, 1970 Japan ................................45/25447

[52] U.S. Cl. ..............................................178/5.4 CD
[51] Int. Cl. ...............................................H04n 9/02
[58] Field of Search .....................178/6.6 A, 5.4 CD, 178/5.4 AC; 179/100.2 B

[56] References Cited

UNITED STATES PATENTS 3,519,761 7/1970 Trost..............................179/100.2 B
3,381,083 4/1968 Jensen et al.....................178/5.4 CD

*Primary Examiner*—Richard Murray
*Attorney*—Sughrue, Rothwell, Mion, Zinn & Macpeak

[57] ABSTRACT

Disclosed is a system and method, applicable to color video magnetic recording and reproducing systems, for determining the optimum recording current for each head of a multi-head assembly to produce optimum picture quality. According to the teachings of the invention the scanning tracks of adjacent heads are made to at least partially overlap by causing the magnetic tape to move at a speed slower than normal. A first head records an FM signal modulated by a color test signal while the adjacent head producing an overlapping scanning track reproduces it. The level of the chroma signal of the reproduced and demodulated color test signal is compared with the test signal to control the level of the recording current.

6 Claims, 4 Drawing Figures

INVENTOR
SATOSHI MAKARA

BY Sughrue, Rothwell, Mion, Zinn & Macpeak

ATTORNEYS

COLOR VIDEO SIGNAL MAGNETIC RECORDING-REPRODUCING SYSTEM HAVING A FUNCTION OF OPTIMUM RECORDING CURRENT LEVEL SETTING

This invention relates to a magnetic recording-reproducing system having a function of setting an optimum recording-current, and particularly to such system as four-head type color television signal tape recorder in which the tape is scanned by a four-head rotary head assembly in a direction vertical to the running direction of the tape.

In four-head type television tape recorders, a carrier signal is frequency-modulated by a video signal and the frequency-modulated video signal (FM video signal) is supplied to the rotary head assembly and is directly recorded on the tape without a bias signal being supplied by saturating heads. In such recorders, the high quality picture is obtained when the reproduced RF signal is in the highest level. Therefore, the level of the optimum recording current is always controlled to provide the maximum reproduced RF signal level.

It is known that the reproduced FM signal level is first increased with the increase in the recording current to reach a saturation or a maximum level extending over a fairly broad range of the recording current, and then is decreased. This is in clear contrast to the change in the chroma signal level, which is increased monotonously with the increase in the recording current.

Generally, the optimum recording current levels of the heads are different from one another and are changed with abrasion of the heads. Therefore, it is necessary to reset the optimum recording current at regular intervals.

Furthermore, in the recording and reproducing of a color video signal having a color subcarrier signal (or a chroma signal), the recording current must be set at a certain value so that the chroma signals extracted by demodulation from the FM signals reproduced by the respective heads may be maintained at the same level to assure the high quality color picutre.

It has been the practice for setting the optimum recording current that a signal of a certain reference frequency signal (for example, of the center frequency of the frequency-modulated video signal) is recorded on the magnetic tape at various recording current levels. In reproduction, the recorded reference-frequency signal is reproduced and measured at every recording current levels. The results are plotted to make a recording-reproducing characteristic curve (electromagnetic characteristic). From this curve, the optimum recording current level is calculated. In a monochrome television video tape recorder, this maximum reproduced RF signal level corresponds directly to the optimum recording current level.

In a color television video tape recorder, however, an RF signal modulated by a color test signal such as a color bar signal is recorded on the tape at the optimum recording current level determined in the above-mentioned manner. Then, the recording tracks are scanned in turn by any one of the four heads to reproduce RF signals, which are then demodulated to chroma signals. The chroma signals corresponding to the respective heads are compared in their levels with one another. If any differences are detected between these levels, the recording current levels are finely adjusted to get rid of such differences.

Thus, the conventional current setting method takes a long time and high skill.

It is therefore an object of this invention to provide a recording-reproducing system for TV color video signals, in which the setting of the optimum recording current is greatly facilitated.

According to the invention, there is provided a recording-reproducing system in which: a head assembly having a plurality of heads is rotated at a regular speed; a magnetic tape is transported at a speed lower than a regular tape speed; FM color test signal is recorded by any one of the heads; and the recorded signal is reproduced by the head immediately following said one of the heads and demodulated; whereby the recording current level is manually adjusted by observing the reproduced signal level or the reproduced picture.

In a four-head standard television video tape recorder, four heads are disposed at intervals of 90° on a circumference of a head drum having a diameter of 2 inches. The head drum is rotated at a speed of 240 revolutions per second. A 2-inch wide magnetic tape is transported at a speed of 15 inches per second. This tape is partly curved like an arc by a female guide at the head drum portion. This brings the tape into firm contact with the drum circumference, whose length corresponds to its central angle of about 120°. Thus, the tape is scanned by the magnetic head at the relative speed of 1,500 inches/sec. in the direction nearly perpendicular to the transport direction. The four heads have the same structure.

In recording, the same FM signal is supplied to these heads simultaneously. The width of each head is 10 mils and accordingly the width of the video recorded tracks are 10 mils. The recorded tracks are aligned on the tape at intervals of 5 mils, slightly slanted at angles of about 33 minutes with respect to the lateral direction of the tape as shown in FIG. 1. (A).

Assuming that the drum is rotated at the normal speed, and the tape speed is slowed down to less than half, the pitch of the recording track is reduced to less than half. As a result, an overlapped area is formed among the recorded tracks of the mutually adjacent magnetic heads. Under this condition, one of the heads serves as a recording head and another one which immediately follows the mentioned one serves as a reproducing head. Then, the signal recorded on the overlapped area is reproduced by another following head, and the recording current of the signal applied to the recording head can be adjusted by observing the reproduced signal picked up by the following head so as to obtain the highest quality picture.

Furthermore, if a signal modulated by the color test signal is applied to the recording head, the recording current of the color television signal can be also adjusted.

Now the features and advantages of the invention will be clearly understood from the following detailed description of a preferred embodiment of the invention taken in connection with the accompanying drawings, wherein.

Figures 1, 2:
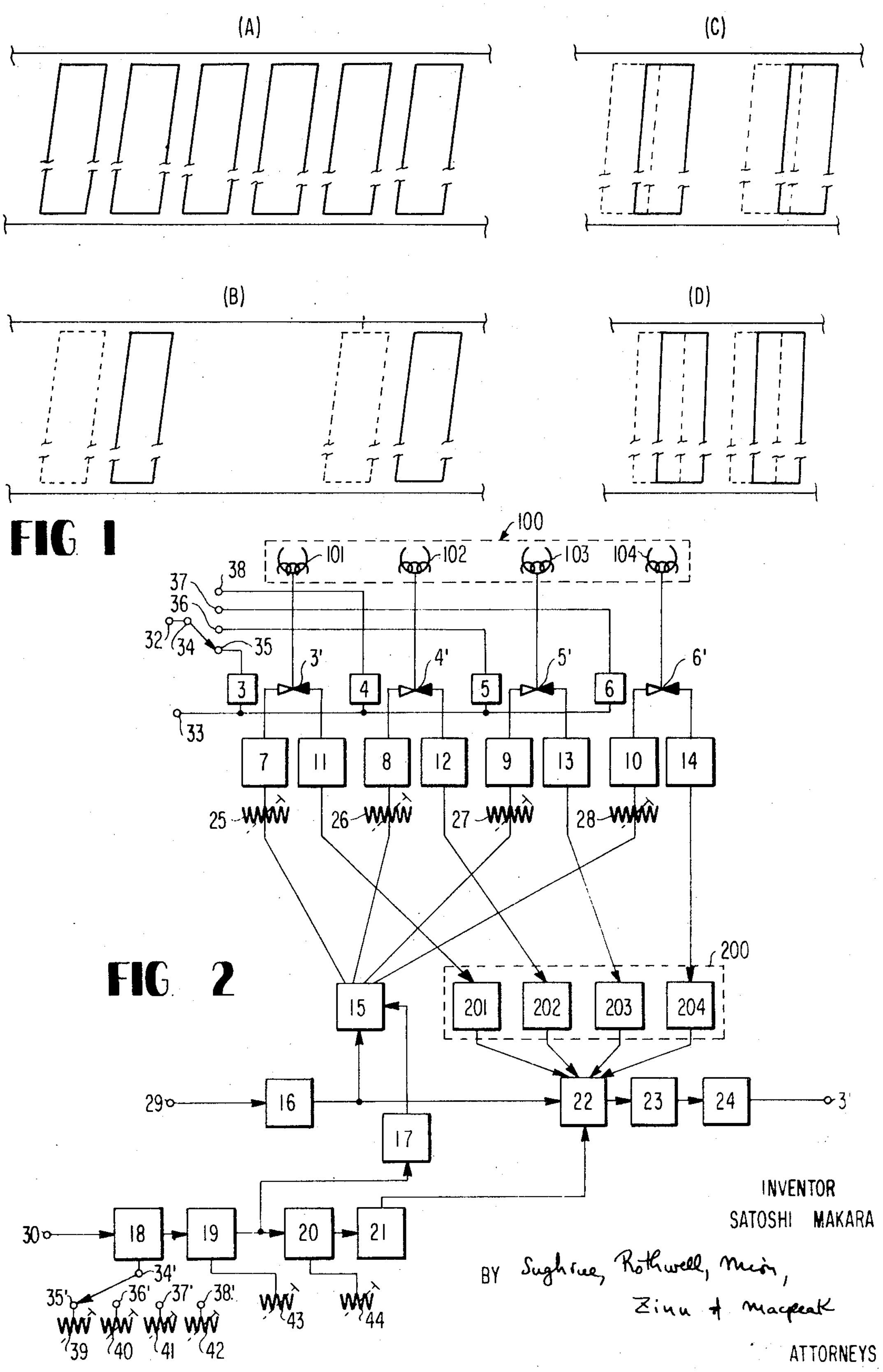
FIG. 1 shows positional relationship on a tape between recorded tracks and reproducing area.
FIG. 2 is a block diagram of an embodiment of the invention.

Referring to FIG. 1, FIG. 1(B) shows the relationship between the recorded track (as indicated by the full line) of one of the recording heads and the tape scanning track (as indicated by the dotted line) of the another head immediately following the mentioned one, under the condition of the normal tape transport speed. FIG. 1(C) shows the relationship between the recording track and the tape scanning track when the tape speed is half of the normal speed. In this case, the width of the overlapped area between the recording track and the scanning track of the following head is about 2.5 mils. While, FIG. 1(D) shows the positional relationship between the recording track and the tape scanning track, observed under the condition where the tape speed is about one-third of the normal speed. In this case, the width of the overlapped area is about 5 mils. In other words, the lower the tape speed is, the wider the overlapped area will be.

The signals modulated by color test signal are reproduced in sequence by the immediately following head with respect to each of the four heads, and the recording current level adjusting means provided for each of the heads is set to make the level of the reproduced chroma signal is coincident with the non-recorded reference chroma signal level. Thus, the optimum recording current value can be set.

According to this method, reproduction by the immediately following head is achieved almost simultaneously with recording. Therefore, the recording current adjusting means can be continuously controlled in the above-mentioned manner, so that the reproduced chroma level may be coincident with the non-recorded chroma level, without requiring repetition of recording and reproduction. Thus, the optimum recording current level can easily be set in a short period of time.

Referring to FIG. 2, a relay control voltage is applied to terminals 32 and 33. When head selection switches 34 and 34' are placed to contacts 35 and 35' respectively, a relay 3 is actuated, and first magnetic head 101 is connected to a recording amplifier 7 by way of a make-contact 3' of the relay 3. The magnetic head assembly 100 comprises magnetic heads 101, 102, 103 and 104, which are disposed on the drum circumference. The tape is scanned in sequence by the magnetic heads 101, 102, 103 and 104.

A color test signal applied to the terminal 29 is frequency-modulated by a modulator 16 and the modulated signal is applied to a recording gate circuit 15 and a reproducing gate circuit 22. When the recording gate circuit 15 is opened by a tachometer pulse (as will be described later) during the scanning of a tape (not shown) by the first magnetic head 101, the FM signal supplied from the modulator 16 is passed through the recording gate circuit 15 and is level-controlled by a recording current adjuster 25 and then amplified by a recording amplifier 7. The amplified signal is recorded on the tape by the first magnetic head 101. The signal from the gate circuit 22 is demodulated to a video signal by a demodulator 23. The chroma component is derived by a high-pass filter 24 and used as a chroma reference signal to be delivered from a terminal 31.

During the scanning of the tape by the second magnetic head 102 after the first magnetic head 101 has completed recording the signal on the tape, the reproducing gate circuit 22 operates to block the FM signal supplied from the modulator 16 and to connect the signal of the reproducing equalizer group 200 to the demodulator 23 by the tachometer pulse. The signal recorded on the tape by the first magnetic head 101 is picked up by the second magnetic head 102, and is supplied to a reproducing amplifier 12 through a break contact 4' of a relay 4. The reproduced signal from the reproducing amplifier 12 is supplied to the demodulator 23 through a reproducing equalizer 202 and reproducing gate circuit 22, and demodulated to a video signal. This video signal is supplied to the high-pass filter 24, whose output is delivered from the terminal 31 as the reproduced chroma signal. The reproducing equalizer group 200, comprising reproducing equalizers 201, 202, 203 and 204 of identical characteristics, is adjusted so that correct chroma level can be demodulated when the signal recorded at the correct recording current level is reproduced from the tape.

Figure 3:
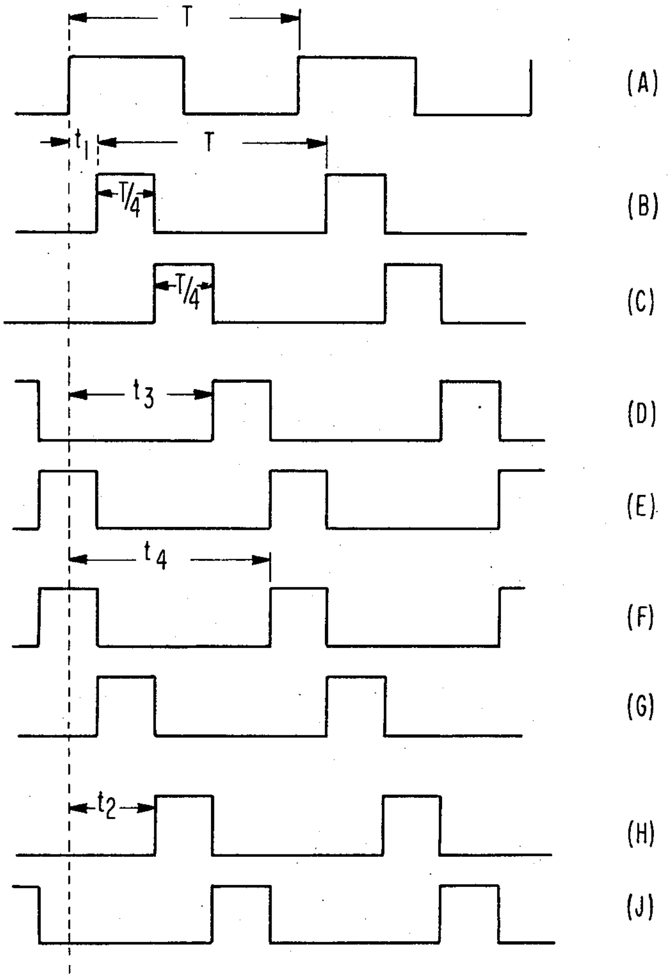
FIG. 3 is a waveform diagram for signals appearing at various parts of the embodiment shown in FIG. 1.

A rotating phase detector such as tachometer (not shown) is directly connected to the head drum on which the heads are installed. Thus the drum rotating phase is detected in the form of symmetrical square wave of repetition period T as shown in FIG. 3(A). This square wave pulse is tachometer pulse which is applied to a delay circuit 18 through a terminal 30 in FIG. 2. The pulse delay circuit 18 is, for example, a monostable multivibrator circuit, in which a pulse delay time can be changed by switching a time constant circuit. When the switch 34' is connected to the terminal 35', the delay time of the pulse delay circuit 18 is set to $t_1$ (FIG. 3) by the delay time adjusting means 39 which determines the rise time of the recording gate pulse (FIG. 3B). This rise time is the time at which the magnetic head to be set the optimum recording current starts scanning the tape. The recording gate pulse is provided from a circuit such as the monostable multivibrator 19. This gate pulse drives the recording gate 15 by way of a drive circuit 17. The width of the recording gate pulse is set to T/4 by an adjusting means 43.

The reproducing gate pulse (FIG. 3C) is provided from a circuit such as a monostable multivibrator 20. The monostable multivibrator 20 is triggered by the trailing edge of the recording gate pulse, and the width of the reproducing gate pulse is set to T/4 by another adjusting means 44. This reproducing gate pulse drives the reproducing gate circuit 22.

When the head selection switches 34 and 34' are connected to terminals 36 and 36' respectively, a relay 5 is actuated and the magnetic head 103 is connected to a recording amplifier 9. And a recording gate pulse as shown in FIG. 3(D) and a reproducing gate pulse as shown in FIG. 3(E) are obtained by the circuits 19 and 20, respectively. The delay time of the delay circuit 18 is adjusted to $t_3$ (FIG. 3) by a delay adjusting means 40. The FM signal from the modulator 16 is caused to pass through the recording gate circuit 15, a level adjuster 27, recording amplifier 9, and the make-contact 5' of the relay 5 and then recorded on the tape by the third magnetic head 103. The recorded signal is reproduced by the following fourth magnetic head 104 and applied to the reproducing gate circuit 22 through a break-contact 6' of a relay 6, a reproducing amplifier 14, and a reproducing equalizer 204. The signal is then gated by the reproducing gate circuit 22, demodulated to a video signal by the demodulator 23. The video signal is then caused to pass through the high-pass filter 24, and delivered as a reproducing chroma monitor signal from the terminal 31.

Similarly, when the head selection switches 34 and 34' are connected to terminals 37 and 37' respectively, the relay 6 is actuated. The FM signal passing through the recording gate circuit 15 by the recording gate pulse as shown in FIG. 3(F) is recorded by the fourth magnetic head 104. The recorded signal is reproduced by the first magnetic head 101, and applied to the reproducing gate circuit 22, and delivered as a monitor output of the fourth magnetic head 104. In this operation, the delay time of the delay circuit 18 is set to $T_4$ as shown in FIG. 3(G).

When the head selection switches 34 and 34' are connected to the terminals 38 and 38' respectively, the relay 4 is acturated. The FM signal caused to pass through the recording gate circuit 15 by a recording gate pulse as shown in FIG. 3(H) is recorded by the second magnetic head 102. The recorded signal is reproduced by the third magnetic head 103 and applied to the demodulator 23 through the gate 22 by the reproducing gate pulse as shown in FIG. 3(J), and delivered as a monitor output of the second magnetic head 102.

Figure 4:
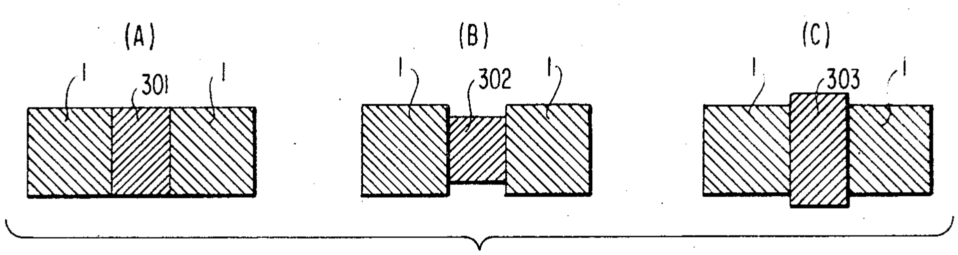
FIG. 4 shows relationship of the reproduced chroma signals.

In FIG. 4, the portions 1 and 1' denote reference chroma signal levels of FM signal extracted from the modulator 16, and the portions 301, 302 and 303 represent reproduced chroma signal levels. FIG. 4(A) shows that the reproduced chroma signal level is coincident with the reference chroma signal level. In other words, FIG. 4(A) shows the state where the recording current setting is completed. FIGS. 4(B) and 4(C) show that the recording current level are low and high respectively.

Thus, according to this invention, the optimum recording current level can be easily set in a short period time, while the reproduced signal is being observed during the recording operation. Furthermore, since the recording current can be varied continuously by virtue of simultaneous reproduction feature, it is possible to exactly set the optimum current level.

What is claimed is:

1. In a color video magnetic recording and reproducing system including a head assembly having a plurality of heads, each head having associated therewith a recording and a reproducing amplifier means, the recording amplifier means including recording current level control means, the head assembly rotating to cause each of the plurality of heads to scan a moving magnetic tape to produce a plurality of scanning tracks, one corresponding to each registration of a head with the tape, the improvement comprising:

a. means for controlling the tape speed to cause the scanning tracks of adjacent heads to at least partially overlap,
b. means for frequency-modulating a carrier wave in response to a color test signal including a chroma component,
c. means for applying the frequency-modulated (FM) signal to one of the heads and thence to the tape through the recording amplifier associated with said one of the heads,
d. means for causing the adjacent head producing a scanning track at least partially overlapping the recorded track to reproduce the recorded signal,
e. means for demodulating the reproduced recorded signal to provide the chroma component included in the demodulated color test signal for comparison with the level of the chroma component included in said recording color test signal, and
f. means for controlling the recording current level control means to achieve an optimum recording current level.

2. The color video magnetic recording and reproducing system of claim 1 wherein said means for applying the FM signal includes recording gate means and said means for reproducing said recorded signal includes reproducing gate means, said improvement further comprising timing means coupled to said recording and reproducing gate means and responsive to the rotation of said head assembly for controlling the switching of said gate means.

3. The color magnetic recording and reproducing system of claim 2 wherein said timing means comprises:

a. means responsive to the rotation of said head assembly for generating a reference signal,
b. first pulse producing means for enabling said recording gate to pass said applied signal over a first predetermined time interval,
c. delay means for delaying said reference signal so that said delayed reference signal energizes said first pulse producing means when said one of the heads begins scanning the magnetic tape,
d. second pulse producing means, responsive to the first pulse means, for enabling said reproducing gate to pass said reproduced signal over a second predetermined time interval, and
e. output means coupled to said reproducing gate means for providing said signal at an output for comparison with said level of chroma component included in said recording color test signal.

4. The color video magnetic recording and reproducing system of claim 3 further including switch means for selectively electrically connecting each of the plurality of heads, one at a time, to its associated recording amplifier, and means for controlling the delay time introduced by said delay means to assure activation of said recording gate means upon the initiation of a sanning track by a head electrically connected to its corresponding recording amplifier.

5. The color video magnetic recording and reproducing system of claim 1 wherein said means for controlling the recording current level is caused to control said recording current level so that the level of said reproduced chroma component may be coincident with the level of the chroma component included in said recording color test signal.

6. In a video magnetic recording and reproducing system including a head assembly having a plurality of heads, each head having associated therewith a recording and a reproducing amplifier means, the recording amplifier means including recording current level control means, the head assembly rotating to cause each of the plurality of heads to scan a moving magnetic tape to produce a plurality of scanning tracks, one corresponding to each registration of a head with the tape, a method for determining optimum recording current levels to each of said heads comprising the steps of:

causing the speed of the said magnetic tape relative to said head assembly to be sufficiently slow to cause at least partial overlapping of scanning tracks produced by adjacent heads, frequency modulating a carrier wave in response to a color test signal including a chroma component, applying the frequency modulated signal to one of the heads and thence to the tape through the recording amplifier means associated with said one of the heads, causing the adjacent head producing a scanning track at least partially overlapping the recorded track to reproduce the recorded signal, demodulating the reproduced recorded signal to provide the chroma component included in the demodulated color test signal, and comparing the level of the reproduced chroma component with the level of the chroma component included in said recording color test signal.

* * * * *